United States Patent
Lanari

(10) Patent No.: US 11,691,816 B2
(45) Date of Patent: Jul. 4, 2023

(54) CASTER WHEEL ALIGNMENT SYSTEM FOR CONVEYOR SYSTEM

(71) Applicant: Dematic S.r.l., Milan (IT)

(72) Inventor: Andrea Lanari, Milan (IT)

(73) Assignee: Dematic S.R.L., Milan (IT)

( * ) Notice: Subject to any disclaimer, the term of this patent is extended or adjusted under 35 U.S.C. 154(b) by 0 days.

(21) Appl. No.: 17/704,319

(22) Filed: Mar. 25, 2022

(65) Prior Publication Data
US 2022/0306389 A1 Sep. 29, 2022

Related U.S. Application Data

(60) Provisional application No. 63/166,035, filed on Mar. 25, 2021.

(51) Int. Cl.
*B65G 13/11* (2006.01)
*B65G 21/14* (2006.01)
(Continued)

(52) U.S. Cl.
CPC .............. *B65G 13/11* (2013.01); *B65G 21/14* (2013.01); *B65G 47/34* (2013.01); *B65G 47/46* (2013.01); *B65G 47/32* (2013.01)

(58) Field of Classification Search
CPC ........ B65G 13/11; B65G 21/14; B65G 47/46; B65G 47/642; B65G 47/34; B65G 47/52
(Continued)

(56) References Cited

U.S. PATENT DOCUMENTS 4,037,291 A * 7/1977 Huempfner ............. B60B 33/02
  16/35 R
4,246,677 A  1/1981 Downing et al.
(Continued)

FOREIGN PATENT DOCUMENTS

EP 3115320 A1 1/2017
JP 8-507737 * 8/1996 ............. B60B 33/02
WO 2016033583 A1 3/2016

OTHER PUBLICATIONS

International Search Report and Written Opinion of the International Searching Authority from corresponding Patent Cooperation Treaty (PCT) Application No. PCT/EP2022/057973, indicated completed on Jul. 10, 2022.

*Primary Examiner* — James R Bidwell
(74) *Attorney, Agent, or Firm* — Gardner, Linn, Burkhart & Ondersma LLP

(57) ABSTRACT

A caster wheel alignment system for selectively re-orienting improperly oriented caster wheels for transport vehicles of a conveyor system, such as a circular sorter. The alignment system includes a main support frame couplable with the conveyor at a drive track of the conveyor. The system includes a horizontal cam for adjusting an orientation of the caster wheel from a leading orientation to a trailing orientation. In some forms, the alignment system may include a bypass system, such as a float frame, supporting the horizontal cam, and a vertical cam. The vertical cam provided to temporarily move the float frame and horizontal cam away from the transport vehicle and/or drive track to permit the vehicle to move through the alignment system. The vertical and horizontal cams coordinate to intercept and correct improperly oriented wheels without significantly impeding the movement of the transport vehicle along the drive track.

20 Claims, 10 Drawing Sheets

(51) Int. Cl.
*B65G 47/46* (2006.01)
*B65G 47/34* (2006.01)
*B65G 47/32* (2006.01)

(58) Field of Classification Search
USPC .............................. 198/370.1, 370.01, 371.2
See application file for complete search history.

(56) References Cited

U.S. PATENT DOCUMENTS

| | | | |
|---|---|---|---|
| 6,112,879 A * | 9/2000 | Fortenbery | B65G 11/023 |
| | | | 198/805 |
| 6,382,392 B1 * | 5/2002 | Fortenbery | B65G 47/962 |
| | | | 198/805 |
| 6,736,254 B1 | 5/2004 | Fortenbery | |
| 7,080,725 B2 * | 7/2006 | Hishinuma | B65G 17/345 |
| | | | 198/370.1 |
| 7,971,701 B2 * | 7/2011 | Fourney | B65G 47/52 |
| | | | 198/779 |

* cited by examiner

CASTER WHEEL ALIGNMENT SYSTEM FOR CONVEYOR SYSTEM

CROSS REFERENCE TO RELATED APPLICATION

The present application claims priority of U.S. provisional application Ser. No. 63/166,035 filed Mar. 25, 2021, which is hereby incorporated by reference herein in its entirety.

FIELD OF THE INVENTION

The present invention is directed to a caster wheel alignment system, and in particular, an alignment system for aligning caster wheels in a conveyor system.

BACKGROUND OF THE INVENTION

Some conveyor systems utilize caster wheels to support different forms of conveyance apparatuses on the conveyor system, such as a cart or shuttle that is supported on a conveyor frame of an endless loop or circular conveyor. Proper orientation of caster wheels is critical to reduce damage and wear to the caster wheels themselves and the conveyor system equipment. Improper orientation of the caster wheels at the time of installation may lead to breakage of conveyor equipment due to jamming and pinching conflicts between the wheels and the frame of the conveyor. As an example, an endless loop conveyor in the form of a circular sorter is a machine composed of a series of transport vehicles connected to each other in a closed loop, wherein the transport vehicles travel on a track defined by the conveyor frame. These transport vehicles may include vertical support caster wheels functionality of re-orienting to allow the transport vehicle to travel along horizontal curves of the conveyor frame. The caster wheels may have an orientation possibility of two hundred and ten degrees (210°) beyond a rectilinear travelling direction. This large degree of orientation possibility permits the transport vehicle to travel along tight conveyor curves. During installation of the transport vehicles within the conveyor system, it is possible that the caster wheels may be positioned in the opposite direction to that of travel, such as if a human installation technician does not carefully inspect and ensure that the caster wheels are properly oriented as the transport vehicle is loaded on the track.

SUMMARY OF THE INVENTION

The present invention provides a caster wheel alignment system, which selectively intercepts miss-oriented or improperly aligned caster wheels of transport vehicles of a conveyor system and re-orients the wheels to a proper trailing orientation. The alignment system includes a horizontal cam for redirecting the miss-oriented caster wheels and a may include a vertical cam, which acts may raise the horizontal cam above an axle of the transport vehicle to permit the vehicle to pass through the alignment system. The system is configured such that the horizontal cam will not impede or impact properly aligned caster wheels of transport vehicles as they pass through the system. The alignment system may preferably be installed on the conveyor system during the process of installing the transport vehicles on the conveyor and is subsequently removed once the installation is complete and the orientation of all the transport vehicle caster wheels is confirmed. While the alignment system is particularly well suited for conveyor systems, it is contemplated that the alignment system may be utilized for many other situations in which caster wheel miss-orientation is common or problematic, such as for autonomous vehicles or shopping carts, for example.

According to one form of the present invention, a caster wheel alignment system is provided for a conveyor and includes a support frame having a stationary frame and a floating frame that is freely movable relative to the stationary frame, a horizontal cam, and a vertical cam. The stationary frame is removably coupled to the frame of the conveyor proximate a track upon which a transport vehicle operates. The float frame is attached to the stationary frame at a float frame guide system and the float frame is substantially freely moveable about a vertical travel path defined by the guide system. The horizontal cam is coupled to the float frame and positioned to impede a travel path of a caster wheel of a transport vehicle that travels upon the drive rail. The horizontal cam is positioned and dimensioned to automatically adjust the orientation of the caster wheel from an improper leading orientation in which the caster wheel is leading an axle of the transport vehicle to a proper trailing orientation in which the caster wheel is trailing the vehicle axle. The vertical cam is coupled to one or both of the float frame and the horizontal cam and the vertical cam, in an initial or lowered position, is positioned to be impacted by a portion of the transport vehicle, such as the axle, as it travels along the drive rail past and/or through the alignment system. The float frame is urged to raise upward, in response to an impact between the vertical cam and the transport vehicle, to raise upward such that the horizontal cam clears the axle and the caster wheel of the transport vehicle to permit the vehicle to pass through the alignment system. The alignment system may include a float guide disposed between the stationary frame and the float frame. The float guide defines the vertical path along which the float frame is movable relative to the stationary frame. In one aspect, the horizontal cam and the vertical cam are each formed of a material having a hardness that is less than the hardness of the caster wheel and the axle of the transport vehicle. Thus, wear and tear on the conveyor components may be reduced, wherein the cams and alignment system may be more easily replaceable than the components of the conveyor.

In one aspect, the horizontal cam is positioned at a forward portion of the float frame and the horizontal cam includes a curvilinear profile having a narrow portion at the forward portion of the float frame and then tapering or widening outward toward the stationary frame to a wide portion proximate a center portion of the float frame. When the caster wheel is in an improper leading orientation, the wheel will make contact with the horizontal cam near the narrow portion and will be urged by the curvilinear profile as it progresses through the alignment system toward the wide portion of the horizontal cam such that the caster wheel is corrected from the improper leading orientation to the proper trailing orientation. Thus, the horizontal cam forces miss-oriented caster wheels to rotate about their swivel axis in order to re-orient to the proper trailing orientation.

In another aspect, the vertical cam includes a plate oriented in a vertical plane and includes an obliquely sloped first contour and a horizontal second contour. The first contour is configured to contact an axle of the transport vehicle as the transport vehicle passes the alignment system and the second contour is configured to retain the float frame in an upward or intermediate position until the axle has passed the second contour. The first contour includes a first height beginning at a forward portion of the float frame and the first contour extends or tapers to a second height proximate a center portion of the horizontal cam. The second contour is substantially horizontal and has a height equal to the second height of the first contour.

According to another form of the present invention, a method is provided for aligning the orientation of caster wheels of a conveyor having a frame, a transport vehicle have a plurality of caster wheels, and a transport vehicle support rail portion that supports the caster wheels. The method includes providing a horizontal cam coupled to a float frame and positioned to intercept a travel path of a caster wheel of the transport vehicle that travels upon the conveyor rail. The horizontal cam is configured and positioned to automatically adjust an orientation of the caster wheel from an improper leading orientation in which the caster wheel is leading an axle of the transport vehicle to a proper trailing orientation in which the caster wheel is trailing the axle. The method also includes providing a vertical cam coupled to one or both of the float frame and the horizontal cam. The vertical cam is configured and positioned to be impacted by a portion of the transport vehicle as it travels along the drive rail into contact with one or both of the cams. The method further includes causing the transport vehicle to travel into contact with one or both of the cams wherein either (i) the horizontal cam intercepts a miss-oriented caster wheel or (ii) the transport vehicle impacts the vertical cam and thereby urges the float frame to raise upward while (i) allowing the horizontal cam to adjust the orientation of an improperly leading caster wheel to a proper trailing orientation and (ii) not allowing the horizontal cam to impact the caster wheel of a transport vehicle if that caster wheel is already properly oriented in a trailing orientation.

Accordingly, the caster wheel alignment system automatically and selectively re-orients or re-positions miss-oriented caster wheels of a conveyor system transport vehicle while allowing the transport vehicle and any properly oriented caster wheels to pass through the alignment system. The system includes a horizontal cam for intercepting miss-oriented caster wheels and a vertical cam for moving the horizontal cam away from the transport vehicle to allow the vehicle to pass the alignment system. The alignment system can be installed onto a conveyor prior to the installation of the transport vehicle to automatically correct any miss-oriented caster wheels of the transport vehicle as the vehicle traverses the conveyor frame. The alignment system may preferably removed after the transport vehicle installation process is completed, however the system may be left in place indefinitely if desired.

These and other objects, advantages, purposes, and features of this invention will become apparent upon review of the following specification in conjunction with the drawings.

DESCRIPTION OF THE PREFERRED EMBODIMENTS

Figure 1:
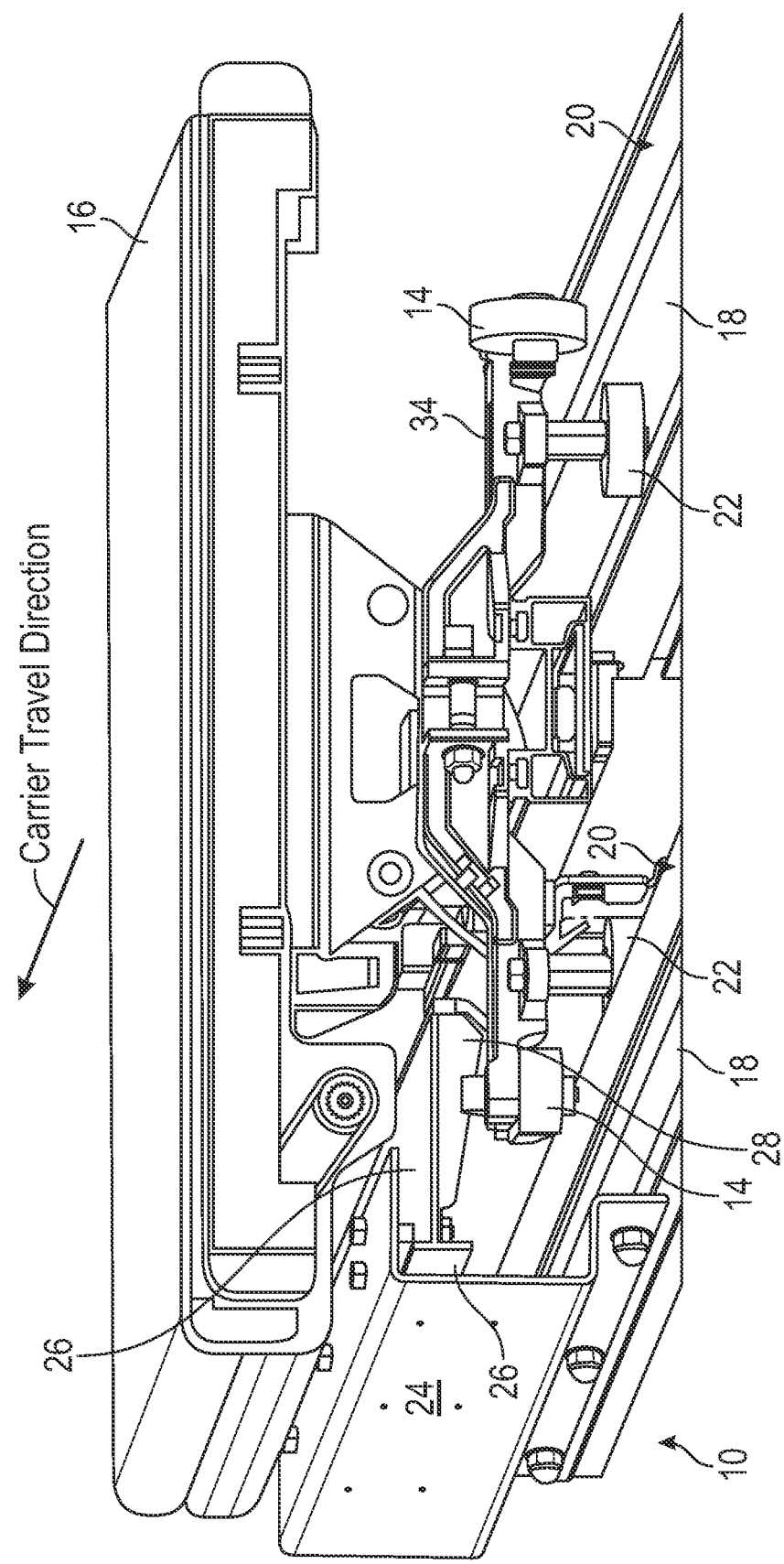
FIG. 1 is a rear-side perspective view of a wheel alignment system mounted on a conveyor system having a transport vehicle with caster wheels, in accordance with the present invention, depicted with one of the caster wheels in an improper leading position.

Referring now to the drawings and the illustrative embodiments depicted therein, a caster wheel alignment system 10 for a conveyor system 12 is provided for automatically re-orienting miss-oriented ones of swivelable caster wheels 14 of transport vehicles, units, trolleys, or carriers 16 of the conveyor system (FIGS. 1-5). The alignment system 10 is configured to mount to a frame 18 of the conveyor proximate the conveyance drive rail, track, or travel path portion 20 of the conveyor, such as parallel, spaced apart tracks or rails of the conveyor frame, upon which the caster wheels 14 travel. The alignment system 10 includes one or more impediment elements capable of selectively redirecting, adjusting, or re-orienting miss-oriented caster wheels 14 and thus preventing or eliminating potential damage to the carriers 16 and conveyor system 12 due to miss-orientation of caster wheels 14. For example, improper orientation of the caster wheels 14 can cause increased stress on the horizontal contact wheels 22 of the carriers 16, which are provided to guide the carriers along the inside of the track 20 (FIGS. 1, 59, and 11-14). The installation of the carriers 16 includes lifting and positioning them on the track 20 and during the lifting and positioning of the carriers 16, it is possible for the caster wheels 14 to orient themselves in an improper position, orientation, or manner, potentially without the installation technician noticing the improper caster wheel orientation. The alignment system 10 is typically installed on the conveyor 12 during the carrier installation process and left in place until all of the carriers 16 have been installed and have travelled around the conveyor 12 at least one time, thus ensuring that all caster wheels 14 are properly aligned. The alignment system 10 may be removed from the conveyor 12 once installation of all carriers 16 is complete and may be reinstalled during maintenance of the conveyor to ensure that the caster wheels 14 of any removed and/or replaced carriers 16 are properly oriented. Optionally, the alignment system 10 may be left on the conveyor system indefinitely with a portion held or pinned in an upward or otherwise out of the way position such that the impediment elements will not impede or conflict with any movements of the carriers 16 as they move about the conveyor 12.

The alignment system 10 is particularly well-suited for endless loop conveyor systems that utilize caster wheel supported transport carriers, as depicted in the illustrated embodiment of FIGS. 1, 5, 8-9, and 11-13. Examples of such endless loop conveyor systems include circular sortation systems marketed by Dematic Corp. of Grand Rapids, Mich. and its affiliates, including crossbelt sorters and split tray sorters. Examples of crossbelt sorters are described in commonly owned U.S. Pat. No. 5,588,520, issued Dec. 31, 1996, U.S. Pat. No. 6,478,138, issued Nov. 12, 2002, U.S. Pat. No. 6,585,101, issued Jul. 1, 2003, U.S. Pat. No. 6,889,814, issued May 10, 2005, U.S. Pat. No. 7,145,095, issued Dec. 5, 2006, U.S. Pat. No. 7,863,536, issued Jan. 4, 2011, and U.S. Pat. No. 9,233,803, issued Jan. 12, 2016, which are each hereby incorporated herein by reference in their entireties. While the caster wheel alignment system 10 is particularly well-suited for use in conveyor systems, it will be appreciated that the alignment system 10 may be adapted and utilized for substantially any system or situation where it is desirable to correct the orientation of miss-oriented caster wheels.

Figure 2:
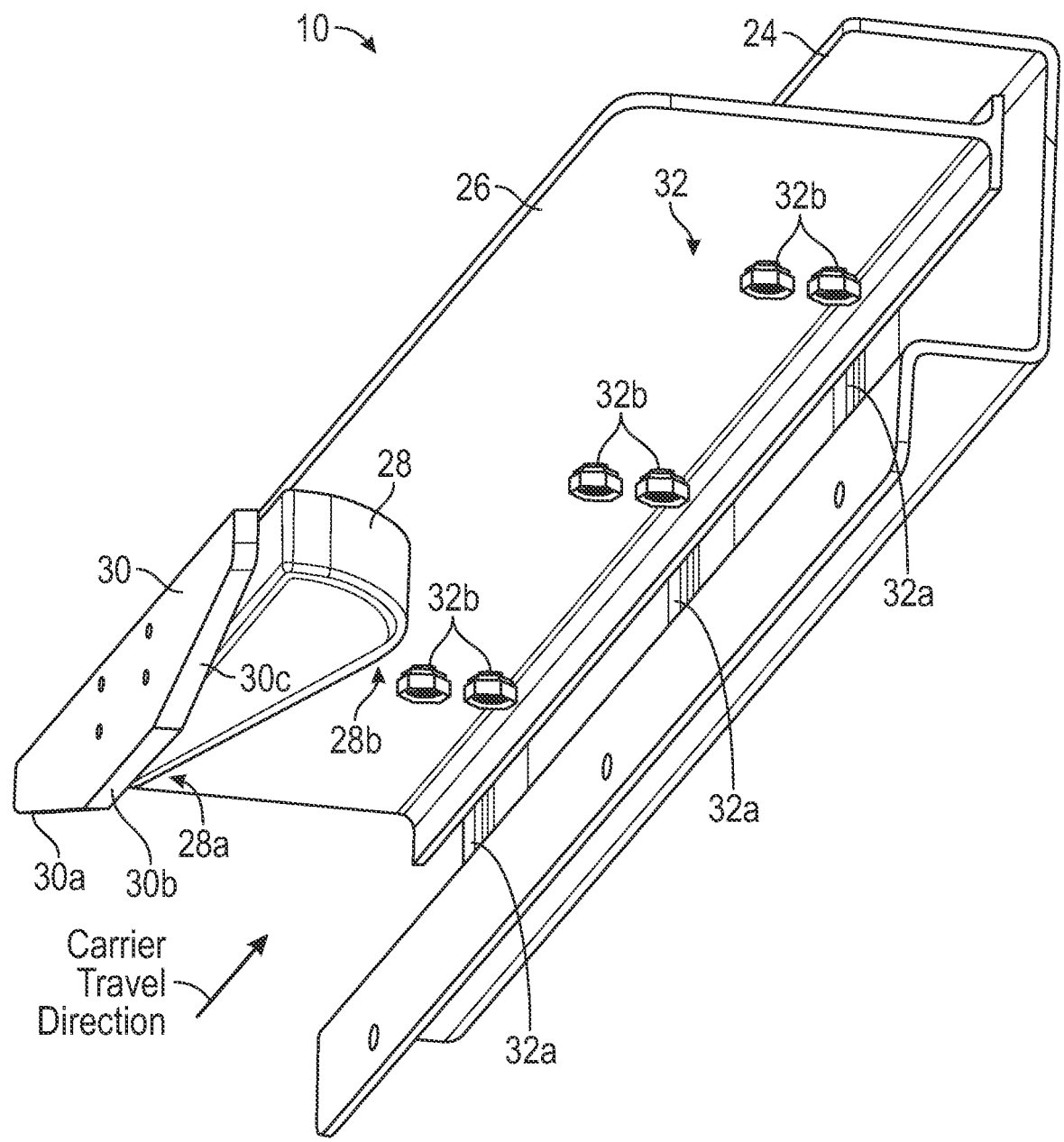
FIG. 2 is a rear-bottom perspective view of the wheel alignment system of FIG. 1, depicted with a float portion of the wheel alignment system in an initial lowered or down position.
Figure 3:
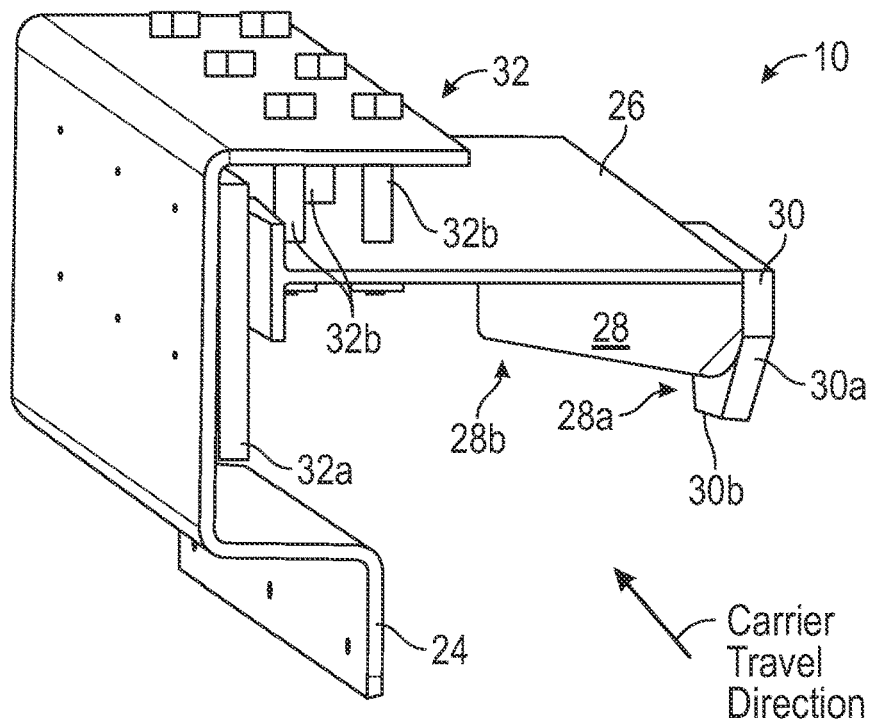
FIG. 3 is a front-top perspective view of the wheel alignment system of FIG. 2.
Figure 4:
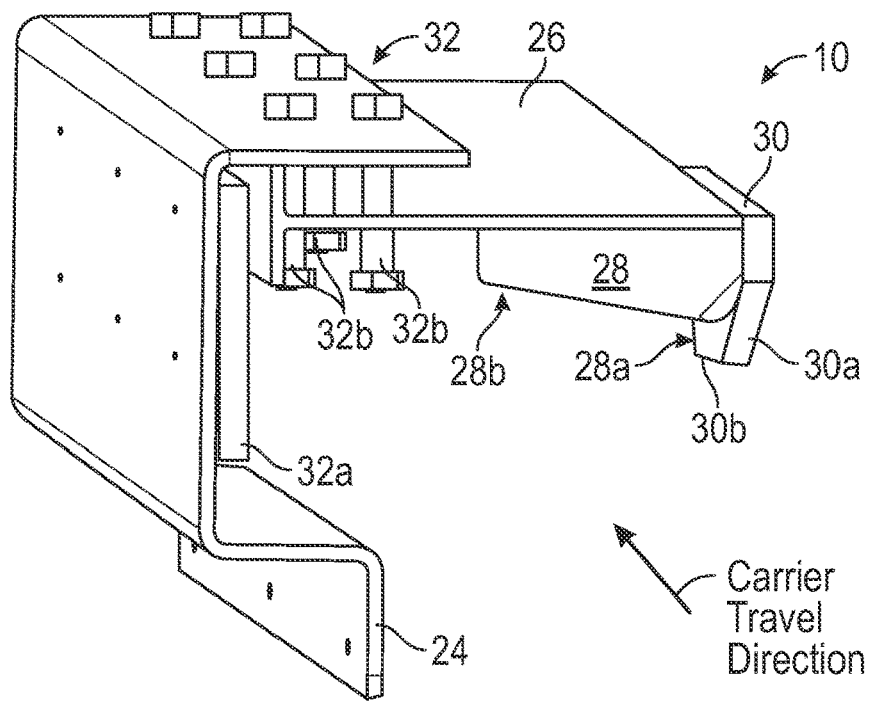
FIG. 4 is another front-top perspective view of the wheel alignment system of FIG. 2, depicted with the float portion of the wheel alignment system in a raised or up position.

Referring now to the illustrated embodiment of FIGS. 1-5, a caster wheel alignment system 10 is provided for a conveyor 12 and includes a support frame having a stationary or main support frame 24 and a bypass system having a floating frame 26 that is movable relative to the stationary frame 24. The system 10 includes one or more impediment elements or redirecting blocks, including one impediment element in the form of a horizontal cam 28 (FIGS. 1-5). The horizontal cam 28 is attached to a forward portion of the float frame 26. The stationary frame 24 is removably attached to the frame 18 of the conveyor 12 proximate a track 20 (FIG. 1). The float frame 26 is attached to the stationary frame 24 at a float frame guide system 32 (FIGS. 2-5). The float frame 26 is substantially freely moveable about a vertical travel path that is defined by the guide system 32. The operation of the float frame 26 and guide system 32 will be discussed in further detail below. A vertical cam 30, is coupled to one, or both, of the horizontal cam 28 and the float frame 26 alongside or proximate the horizontal cam 28 and forms a portion of the bypass system provided for moving the horizontal cam 28 out of the travel path of properly oriented caster wheels (FIGS. 2-4).

Figure 5:
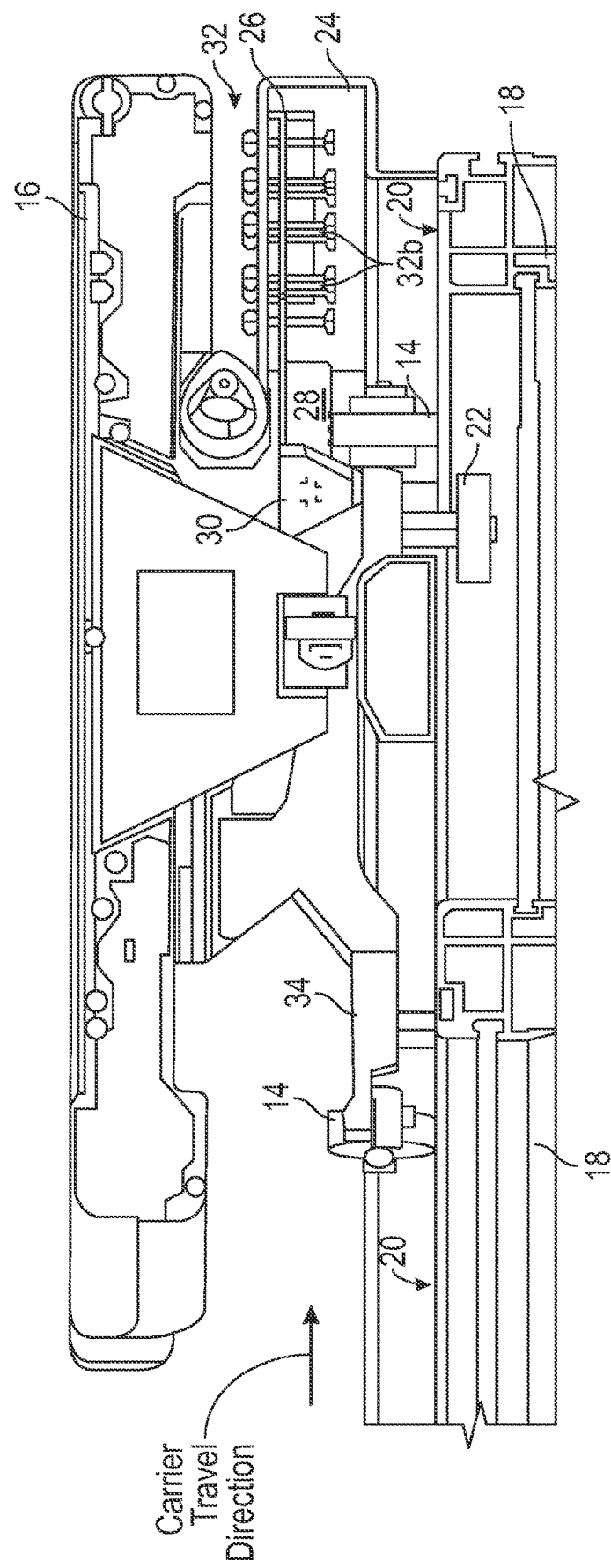
FIG. 5 is a rear-side perspective view of the wheel alignment system, conveyor system, and transport vehicle of FIG. 1.
Figure 6:
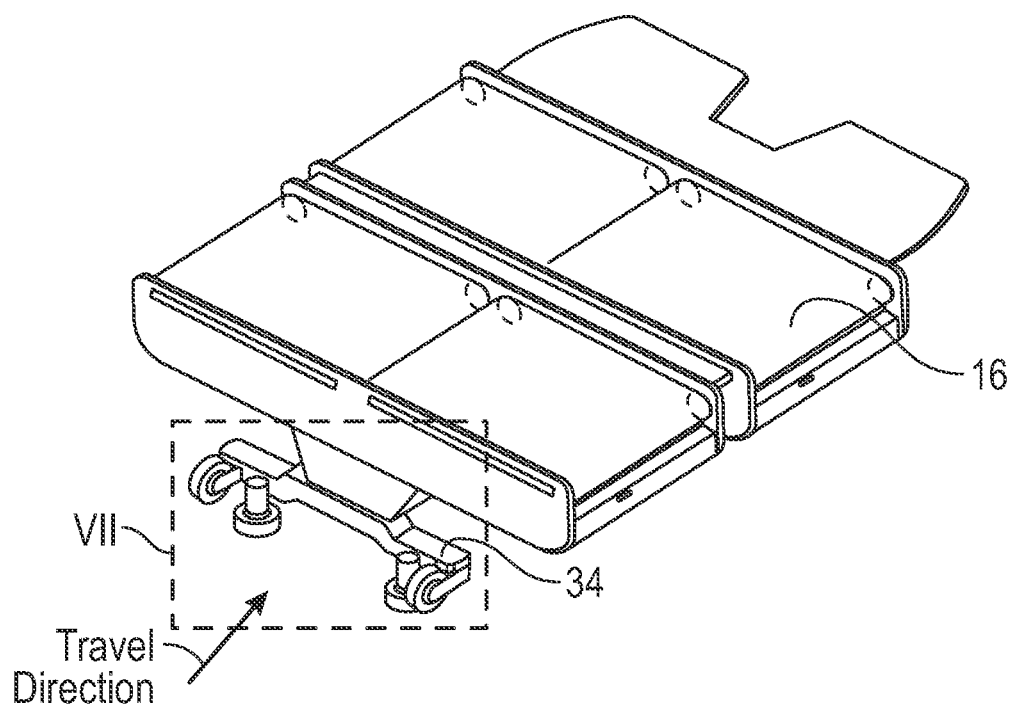
FIG. 6 is a top-side perspective of a transport vehicle for a conveyor system, depicted with a pair of swivelable caster wheels in a proper trailing position.
Figure 7:
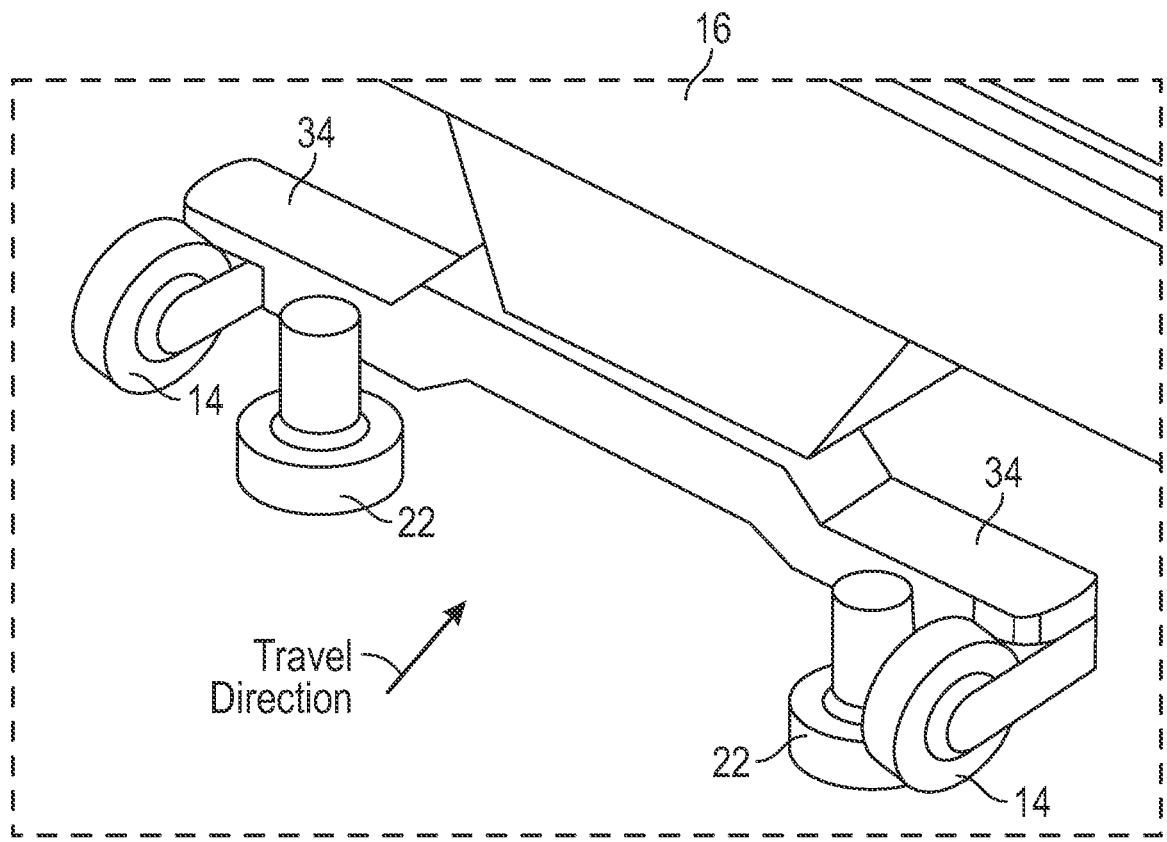
FIG. 7 is an enlarged view of the region designated VII in FIG. 6.
Figure 8:
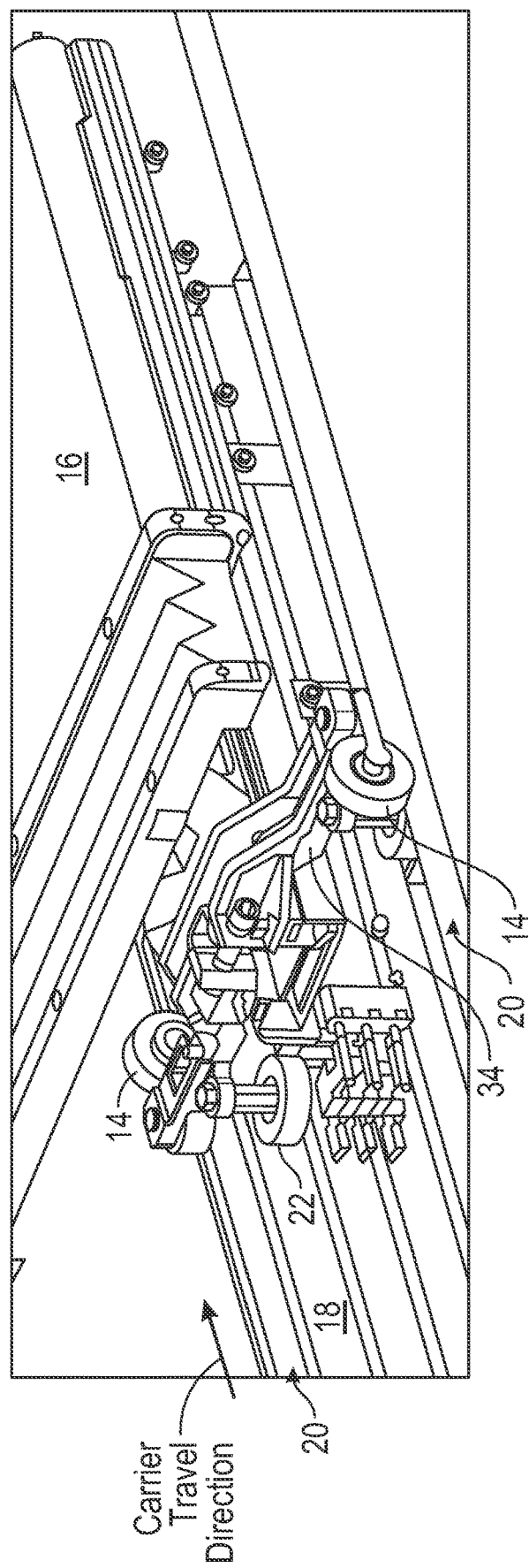
FIG. 8 is a rear, top-side perspective view of the conveyor system and transport vehicle of FIG. 1, depicted with the wheel alignment system omitted and one of the caster wheels in an improper leading position.
Figure 9:
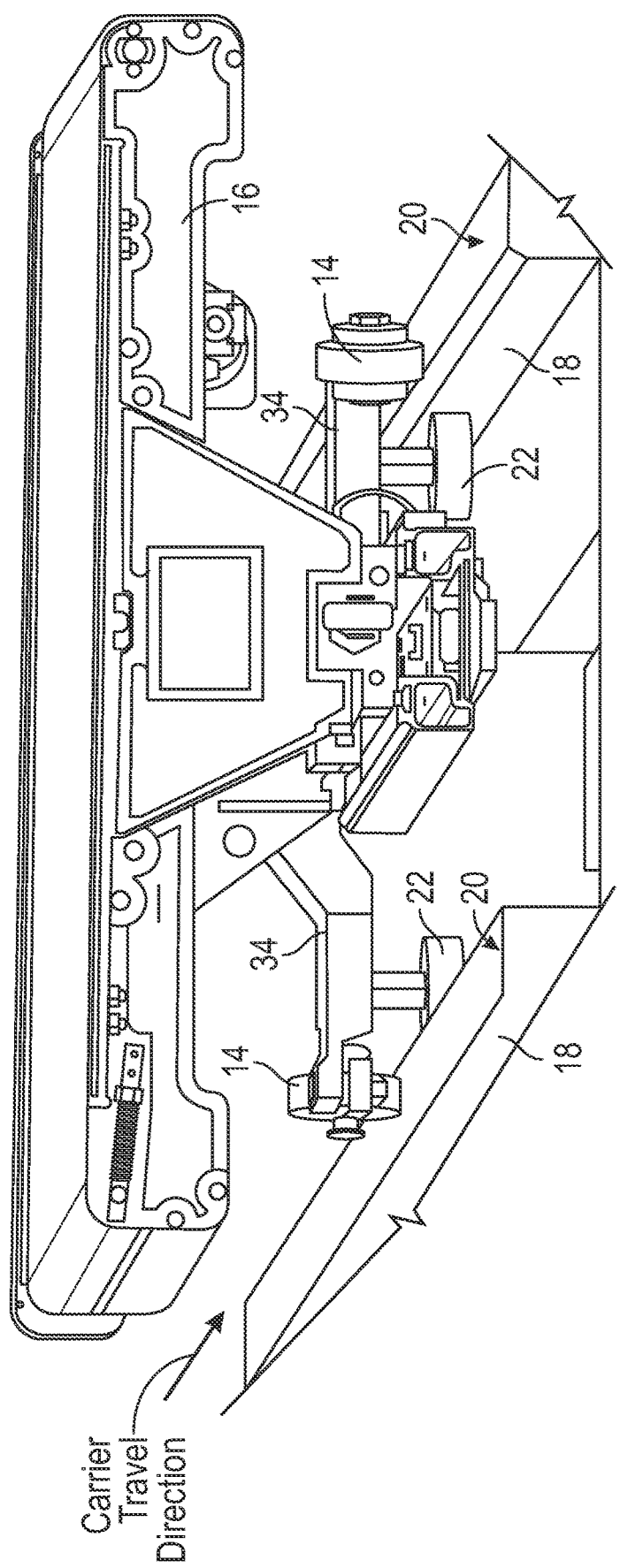
FIG. 9 is a front-side perspective view of the conveyor system and transport vehicle of FIG. 8.
Figure 10A:
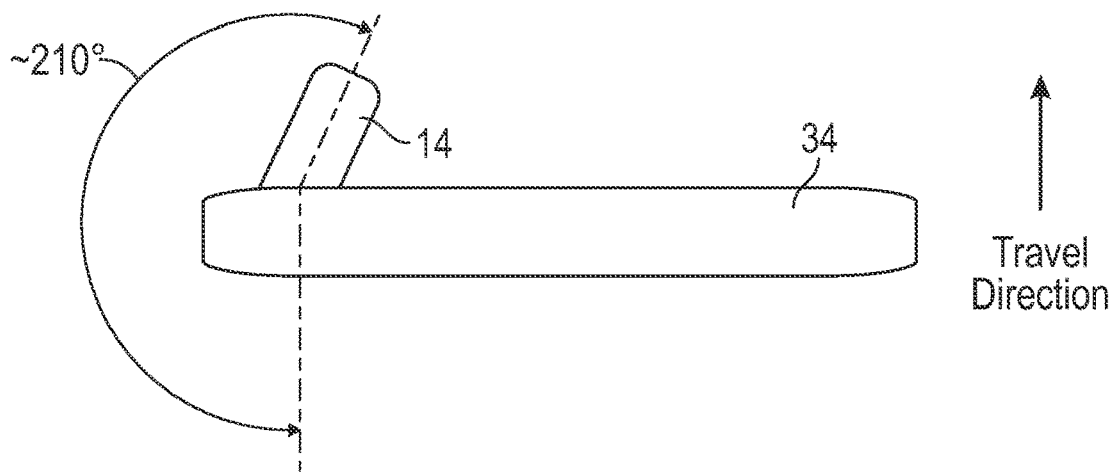
FIG. 10A is a plan view of a caster wheel and axle of a transport vehicle for a conveyor system, depicting the caster wheel in an improper leading position.
Figure 10B:
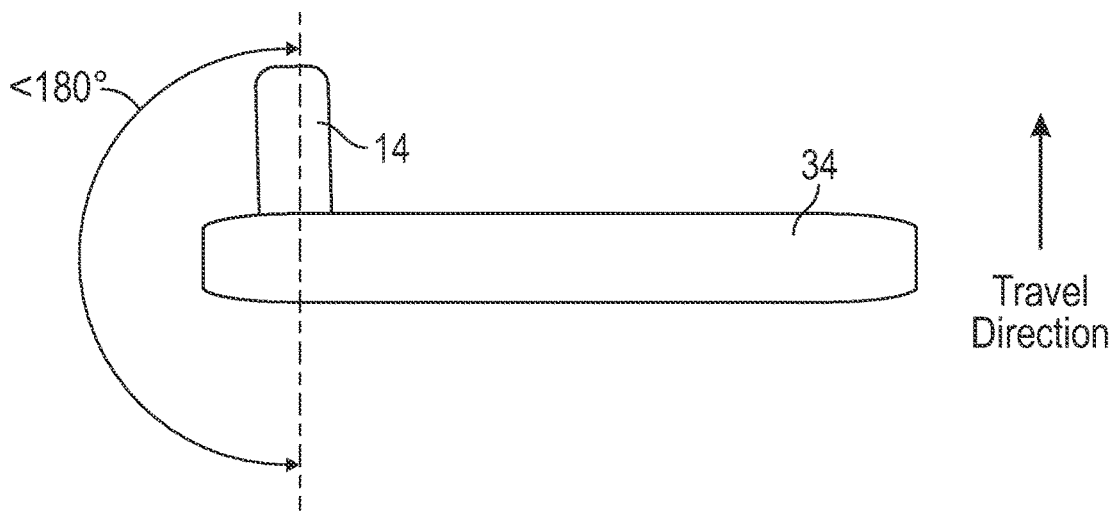
FIG. 10B is another plan view of the caster wheel and axle of FIG. 10A, depicting the caster wheel in an improper leading position that may automatically re-orient itself to a proper trailing position as the transport vehicle moves forward.
Figure 10C:
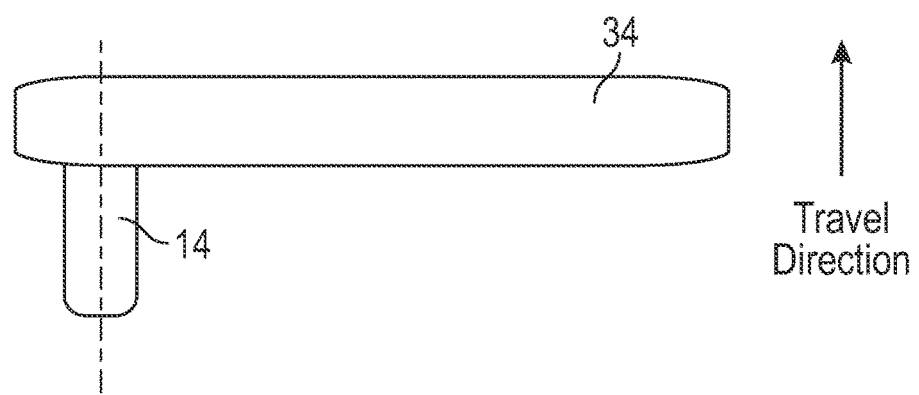
FIG. 10C is another plan view of the caster wheel and axle of FIG. 10A, depicting the caster wheel in a proper trailing position.
Figure 11:
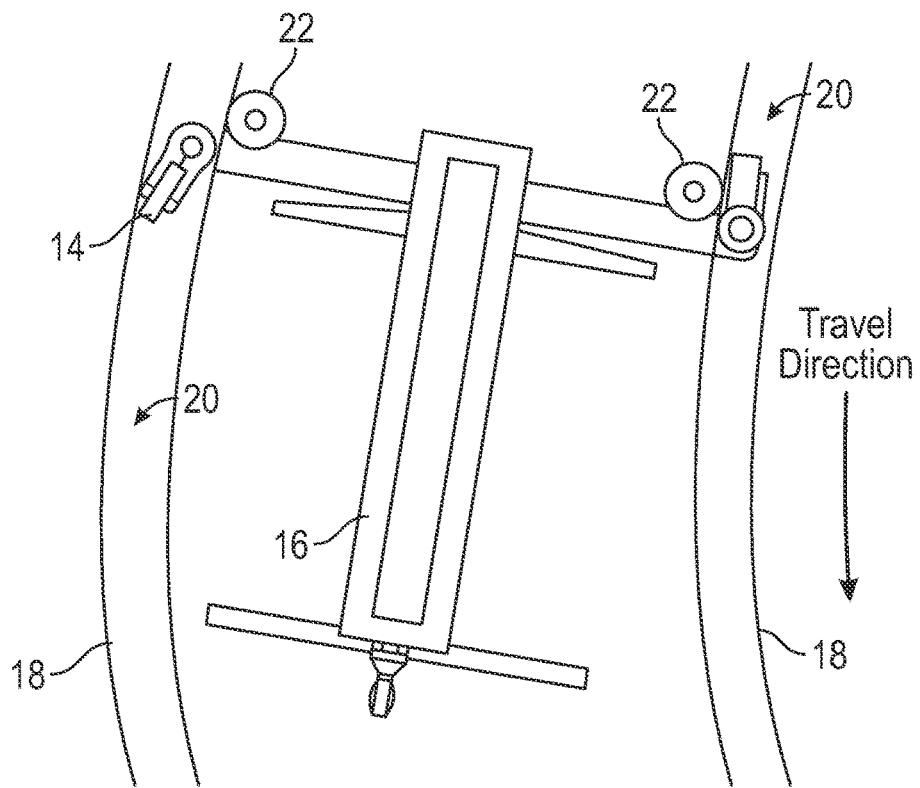
FIG. 11 is a plan view of a curved portion of the conveyor system and a support frame of the transport vehicle of FIG. 1, depicted with one of the caster wheels in an improper leading position and depicting the motion of the support frame around the curved portion of the conveyor system.
Figure 12:
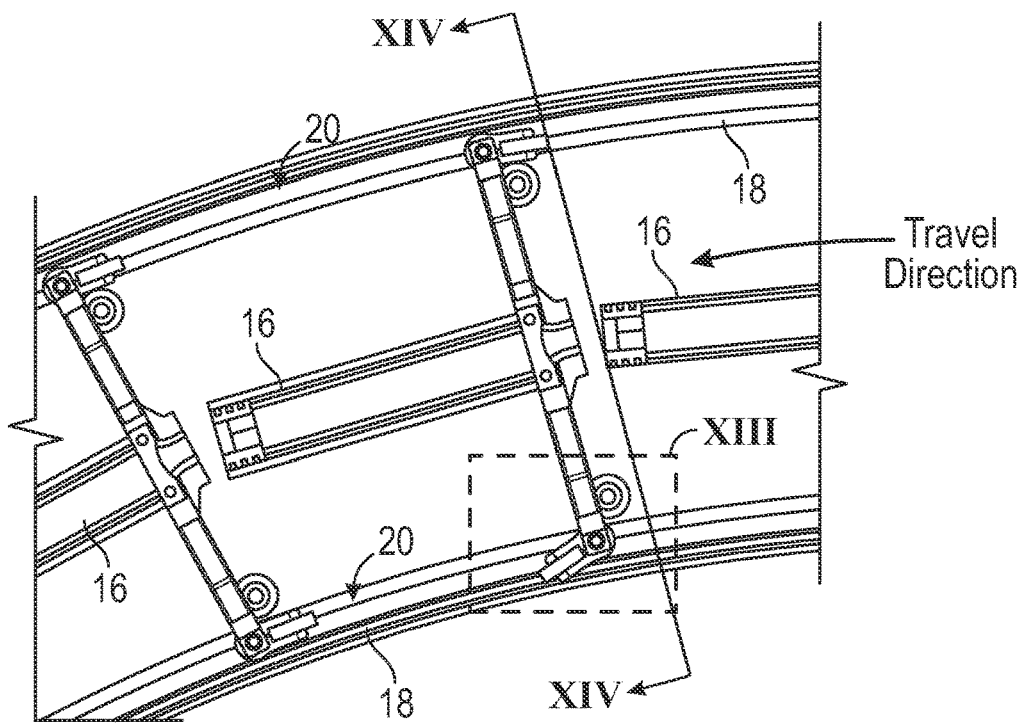
FIG. 12 is a plan view of the curved portion of FIG. 11 and a plurality of support frames of transport vehicles moveably disposed along the curved portion, the central support frame depicted with one caster wheel in an improper leading position.
Figure 13:
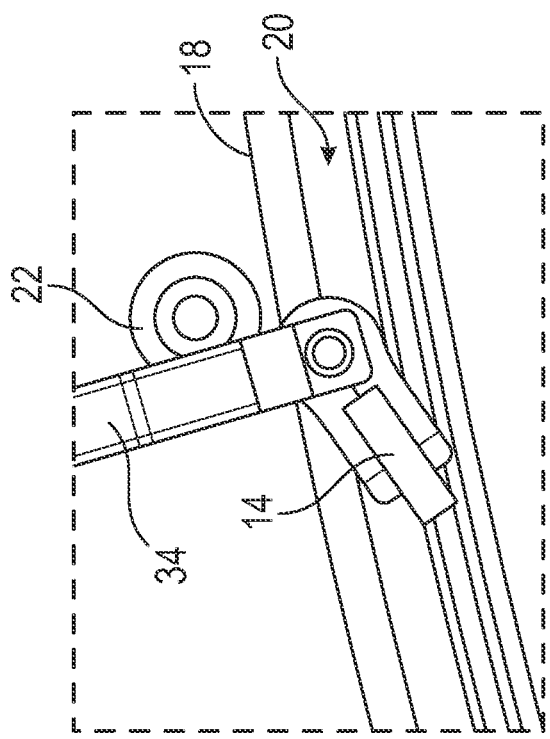
FIG. 13, is an enlarged view of the region designated XIII in FIG. 12.

The horizontal cam 28 is positioned to impede the travel path of a caster wheel 14 of a carrier 16 that travels upon the track 20 (FIGS. 1 and 5). In the event that a caster wheel 14 is miss-oriented such that the wheel 14 is preceding the axle 34 of the carrier 16 when the carrier is traveling in the forward direction (see FIGS. 1, 5, 8-10A, and 11-14), the horizontal cam 28 will intercept the miss-oriented wheel 14 as it travels through the alignment system 10. When the miss-oriented caster wheel 14 impacts the horizontal cam 28 the cam 28 automatically adjusts the orientation of the caster wheel 14 from an improper leading orientation (i.e. the caster wheel is leading the axle 34, see FIG. 10A) to a proper trailing orientation (FIG. 10C) in which the caster wheel 14 is trailing the axle 34. In the illustrated embodiments, the horizontal cam 28 is positioned toward a forward portion of the float frame 26 to intercept a miss-oriented wheel as soon as it enters the alignment system 10 (FIGS. 2-4). As best shown in FIGS. 2-4, the horizontal cam 28 includes a curvilinear profile or obliquely angled portion starting at a narrow portion 28a toward the forward portion of the float frame 26 and tapering laterally toward the stationary frame 24 to a wide portion 28b proximate to a center portion of the float frame 26. As the miss-oriented caster wheel, in the improper leading orientation, makes contact with the horizontal cam 28 near the narrow portion 28a the wheel 14 is urged by the curvilinear profile as it progresses through the alignment system 10. The curvilinear profile of the horizontal cam 28 continues to force the miss-oriented wheel to rotate about its vertical swivel axis until the wheel is sufficiently re-oriented. For example, the caster wheel 14 may be sufficiently re-oriented once the wheel is less than one hundred eighty degrees (180°) from its proper trailing orientation (see FIG. 10B). Once the miss-oriented caster wheel 14 is sufficiently re-oriented, the continued forward travel of the carrier 16 and the friction between the wheel 14 and the track 20 will continue to rotate the wheel toward its proper trailing orientation (FIG. 10B).

The upper portion of the caster wheels 14 of the carriers 16 occupy a common horizontal plane as a portion of the axle 34. Because of this, the horizontal cam 28 would intercept and impact against the axle 34 as it travels through the alignment system 10, thus preventing the carrier 16 from moving forward. The bypass system, in the form of a vertical cam 30, is provided to eliminate the conflict between the horizontal cam 28 and the axle 34. The vertical cam 30 is positioned to contact the axle 34 as it travels past and/or through the alignment system 10. The vertical cam 30 is defined by a plate oriented in a vertical plane (FIGS. 2-5). The plate of cam 30 includes an obliquely sloped first contour 30a and a horizontal second contour 30b. The contours 30a and 30b define or set the vertical travel path that the float frame 26 will move about as the axle 34 contacts the vertical cam 30 (FIGS. 2-4). The first contour 30a begins at a first height proximate the forward portion of the float frame 26 and the first contour 30a extends to a second height proximate a center portion of the horizontal cam 28. The second contour 30b is substantially horizontal and has a height equal to the second height of the first contour 30a (FIGS. 2-4).

When the axle 34 impacts the vertical cam 30 at the first contour 30a, the impact force and continued contact between the axle 34 and first contour 30a urges the float frame 26 to raise such that the horizontal cam 28 moves above the axle 34 and the caster wheel 14 such that the horizontal cam 28 does not impact the axle 34 as the axle 34 passes the horizontal cam 28. The second contour 30b retains the float frame 26 in the upward position until the axle 34 has passed the second contour 30b. The vertical cam includes a third contour 30c, which permits the float frame to gradually return to its initial lowered or down position (FIG. 2). The third contour 30c may have a slope equivalent to the first contour 30a, but in the reverse direction. An additional benefit to the horizontal cam 28 raising above the axle 34 is that the cam 28 will also pass over a properly oriented caster wheel 14, thus reducing wear on the caster wheel 14 by eliminating unnecessary contact between properly oriented caster wheel 14 and the horizontal cam 28. Accordingly, the vertical cam 30 is provided to move the float frame 26 in the vertical plane such that as the carrier 16 moves through the alignment system 10, the vertical cam 30 contacts with the axle 34 and, by way of the float frame guide 32, the float frame 26 lifts upward such that the horizontal cam 28 moves out of the way of and does not impact the axle 34, thus allowing the carrier 16 to travel through and past the alignment system 10.

The horizontal cam 28 and the vertical cam 30 are positioned alongside one another such that the horizontal cam 28 is in the lowered position long enough to intercept miss-oriented caster wheels 14 of carriers 16. As the curvilinear profile of the horizontal cam 28 re-orients the miss-oriented caster wheel, the axle impact along the first contour 30a of the vertical cam 30 begins to urge the float frame 26 upward until the horizontal cam 28 is above the axle 34 of the carrier 16 and also above the caster wheel 14. The positioning and dimensioning of the cams 28 and 30 ensure that the horizontal cam 30 is able to re-orient miss-oriented caster wheels while also permitting the carrier 16 to pass through the alignment system 10 without substantially impeding the movement of the carrier 16 along the conveyor 12. It will be appreciated that different dimensions, shapes, and relative positions of the cams 28 and 30 may be provided to adjust the timing and duration of the relative actions of the cams 28 and 30 as desired or required based on the component dimensions and configurations of a particular conveyor system.

The float frame guide 32 of the illustrated embodiment of FIGS. 1-5 includes a set of slide rails 32a that support a proximal end of the float frame 26 at the stationary frame 24. The slide rails 32a may have a notched portion that is received in a slot defined in the float frame 26 and the notch and slot configuration may be substantially frictionless to allow the float frame 26 to move freely relative to the stationary frame 24. The float frame guide 32 also includes a plurality of vertical guide shafts 32b, which pass through holes in the float frame 26 (FIGS. 2-4). The guide shafts 32b cooperate with the slide rails 32a to retain the float frame 24 in a substantially horizontal orientation while permitting the frame 26 to raise and lower vertically. It will be appreciated that while the slide rails 32a and guide shafts 32b provide stability against rotation and torsion of the float frame 26 relative to the stationary frame 24, one of the set of slide rails 32a and plurality of guide shafts 32b may be omitted without substantially affecting the function of the float frame 26. It will also be appreciated that other known guide apparatuses may be utilized to slideably couple the float frame 26 to the stationary frame 24. While the float frame 26 of the illustrative embodiment is defined as moving in a vertical plane, it will be appreciated that the float frame 26 may be moveable in other directions to move the horizontal cam 28 out of the travel path of the caster wheel 14. For example, the float frame 26 may be pivotable relative to the main frame 24 such that the float frame 26 moves about a horizontal plane to move the horizontal cam 28 out of the caster wheel travel path.

A key aspect of the operation of the illustrative embodiment of alignment system 10 is that the horizontal cam 28 receives substantially horizontal force from a miss-oriented wheel 14 and reacts with a substantially horizontal force, thus impacts between the caster wheel and the horizontal cam do not activate the vertical sliding of the float frame 26. The axle 34, on the other hand, applies only a substantially vertical force to the vertical cam 30 and the vertical cam 30 reacts with a substantially vertical force, thus urging the float frame 26 to float or move upward to allow the carriers 16 to pass through the alignment system 10. In order to reduce or eliminate wear on the caster wheels 14 and axles 34 due to contact with the cams 28, 30, the cams are formed of a material having a hardness that is less than that of the wheels 14 and axles 34. For example, the cams 28 and 30 may be formed of a relatively soft polyurethane while the caster wheels are formed of a relatively hard polyurethane and the axles are formed of a relatively hard metal. Because the cams 28, 30 are softer than the caster wheels 14 and axles 34, the cams will wear over time as they are impacted by the wheels 14 and axles 34. It will be appreciated that in some embodiments the vertical cam 30 may be omitted without substantially affecting the function and operability of the alignment system 10 to redirect improperly oriented caster wheels 14. It is contemplated that a bypass system may be provided with the alignment system, such as in the form of an actuation device and/or a sensor system, to permit properly oriented caster wheels to pass the horizontal cam in response to the transport vehicle passing through said alignment system. The sensor system is operable to determine whether an incoming caster wheel is improperly oriented. The actuation device is operable to move the horizontal cam, such as by raising and/or lowering the float frame or pivoting the horizontal cam, to move the horizontal cam out of the path of a properly orientated caster wheel. It will also be appreciated that the horizontal cam 28 may be coupled to the stationary frame in a manner such that the horizontal cam is fixed in relation to the frame of the conveyor 12. In such embodiments, the float frame 26 may be omitted without substantially affecting the function and operability of the alignment system 10 to redirect improperly oriented caster wheels 14.

Figure 14:
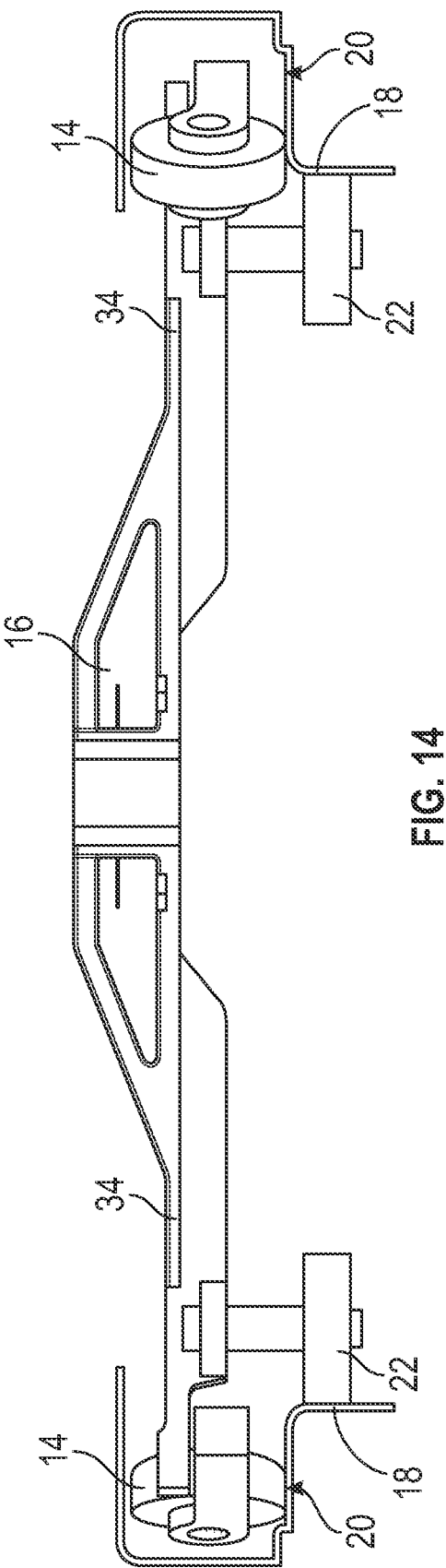
FIG. 14 is a sectional view of a portion of the conveyor system of FIG. 12 taken along line XIV-XIV and depicting a rear perspective view of the support frame having the one caster wheel in the improper leading position.

Optionally, the alignment system 10 may be left on the conveyor system indefinitely and the float frame 26 may be pinned in an upward or intermediate position such that the impediment elements will not impede or conflict with any movements of the carriers 16 as they move about the conveyor 12. It will be appreciated that in some embodiments, the travel path of the conveyor may constrain the rotation of a caster wheel such that the caster wheels are unable to rotate from a leading orientation to a trailing orientation (e.g. one hundred eighty degrees (180°)), such as when constrained in a c-channel, such as depicted in FIG. 14, for example. In such embodiments, a portion of the travel path 20 and/or conveyor frame 18 may be substituted with the alignment system 10 such that the stationary frame 24 may permit a caster wheel to rotate from a leading orientation to a trailing orientation (e.g. one hundred eighty degrees (180°)) without being constrained by the conveyor frame 18.

A method is provided for aligning the orientation of caster wheels 14 of a conveyor 12 having a frame 18, a conveyance track or drive rail portion 20 defining a carrier or transport vehicle travel path, a carrier or transport vehicle 16 moveably supported on the conveyance track 20, and a pair of caster wheels 14 of the carrier 16 which each travel upon respective sides of the conveyance track 20. The method includes providing a wheel alignment system 10 including at least one impediment element in the form of a horizontal cam 28 coupled to a float frame 24 with the horizontal cam 28 positioned to intercept a travel path of the caster wheel 14 of the carrier 16 that travels upon the track 20 (FIGS. 1-5). If the caster wheel 14 is miss-oriented, such as in a leading orientation where the wheel 14 leads the axle 34 of the carrier 16, the horizontal cam 28 impedes and automatically adjusts the orientation of the caster wheel 14 from the improper leading orientation to a proper trailing orientation in which the caster wheel 14 is trailing the axle 34. The method also includes providing another impediment element in the form of a vertical cam coupled to either or both of the float frame 26 and the horizontal cam 28. The vertical cam 30 intercepts a portion of the carrier 16, such as the axle 34, as the carrier 16 travels along the track 20 past and/or through the system 10 and into contact with one or both of the cams 28, 30. The method further includes causing the carrier 16 to travel past and/or through the cams 28, 30 such that the carrier 16 will impact the vertical cam 30 and thereby urge or force the float frame 26 to raise while allowing the horizontal cam 28 to intercept and adjust the orientation of a misaligned caster wheel from an improper leading orientation to a proper trailing orientation and permitting the carrier 16 to pass the alignment system 10 without the horizontal cam 28 impacting either of the axle 34 or a properly oriented trailing caster wheel 14 of a carrier 16.

Thus, the caster wheel alignment system includes a horizontal cam that is provided for intercepting and correcting the orientation of a caster wheel that is leading the axle of a transport vehicle as it traverses a conveyor system and a vertical cam that is provided for moving the horizontal cam out of the way of the transport vehicle to permit the vehicle to pass through the alignment system, such as when a subject caster wheel of the transport vehicle is in a proper trailing orientation. The horizontal cam and vertical cam cooperate with one another to effectively, selectively and automatically, re-orient improperly oriented or misaligned caster wheels without having to perform a visual inspection and without removing the transport vehicle from the conveyor track.

Changes and modifications in the specifically described embodiments can be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A caster wheel alignment system for a conveyor having a frame defining an endless loop travel path and a transport vehicle having a plurality of caster wheels configured to travel along the travel path, said alignment system comprising:
   a support frame configured to couple to a portion of the frame of the conveyor;
   a horizontal cam coupled to said support frame and positioned to intercept a travel path of a subject one of the plurality of caster wheels of the transport vehicle that travels along the travel path, said horizontal cam configured to automatically adjust an orientation of the subject caster wheel from an improper leading orientation in which the caster wheel is leading an axle of the transport vehicle to a proper trailing orientation in which the caster wheel is trailing the axle.

2. The alignment system of claim 1, wherein said support frame is removably coupled to the frame of the conveyor proximate the transport vehicle travel path of the conveyor.

3. The alignment system of claim 2, further comprising a bypass system comprising:
   a float frame moveably coupled to said support frame and configured to move substantially freely about a vertical path relative to said support frame; and
   a vertical cam coupled to at least one of said float frame and said horizontal cam, said vertical cam configured to intercept and impact a portion of the transport vehicle as it travels along the travel path through said alignment system, wherein the impact between said vertical cam and the transport vehicle urges said float frame to raise such that said horizontal cam does not impact the subject caster wheel of a transport vehicle if that caster wheel is properly oriented in a trailing orientation.

4. The alignment system of claim 3, further comprising a float guide disposed between said support frame and said float frame, said float guide defining the vertical path along which said float frame is movable relative to said support frame.

5. The alignment system of claim 3, wherein said horizontal cam and said vertical cam are each formed of a material having a hardness that is less than a hardness of the caster wheel of the transport vehicle.

6. The alignment system of claim 3, wherein said horizontal cam is disposed proximate a forward portion of said float frame and said horizontal cam comprises a guide profile having a narrow portion at the forward portion of said float frame and then tapering in a widening manner toward said support frame to a wide portion proximate a center portion of said float frame, wherein a caster wheel in an improper leading orientation will make contact with said horizontal cam near said narrow portion and will be urged by the guide profile as it progresses through said alignment system toward the wide portion of said horizontal cam such that the caster wheel is corrected from the improper leading orientation to the proper trailing orientation.

7. The alignment system of claim 6, wherein said guide profile comprises a curvilinear profile.

8. The alignment system of claim 3, wherein said vertical cam comprises a plate oriented in a vertical plane and having an obliquely sloped first contour and a horizontal second contour, said first and second contours configured to contact an axle of the transport vehicle as the transport vehicle passes said alignment system, said first contour having a first height beginning at a forward portion of said float frame and said first contour extending to a second height proximate a center portion of said horizontal cam, said second contour substantially horizontal and having a height equal to said second height of said first contour.

9. A caster wheel alignment system for a conveyor having a frame defining a travel path and a transport vehicle having a plurality of caster wheels configured to travel along the travel path, said alignment system comprising:
   a support frame configured to couple to a portion of the frame of the conveyor;
   a horizontal cam coupled to said support frame and having an angled portion that is oblique to the travel path of a subject one of the plurality of caster wheels of the transport vehicle, said angled portion configured impede the travel of the caster wheel as it passes said wheel alignment system to urge the caster wheel to rotate about a swivel axis from an improper leading orientation in which the caster wheel is leading an axle of the transport vehicle to a proper trailing orientation in which the caster wheel is trailing the axle; and
   a bypass system configured to urge a moveable portion of said support frame to move in response to the transport vehicle passing through said alignment system to permit a properly aligned caster wheel of a transport vehicle to pass said wheel alignment system without contacting said horizontal cam.

10. The alignment system of claim 9, wherein said bypass system is coupled with said support frame and comprises a float frame configured to move substantially freely about a vertical path relative to the frame of the conveyor and the travel path and a vertical cam to urge said float frame to move about the vertical path in response to the transport vehicle moving through said alignment system, wherein said float frame is moveable between an initial position in which said horizontal cam is in a position to intercept the travel path of the subject caster wheel and said vertical cam is in a position to intercept a portion of the transport vehicle and an intermediate position in which said horizontal cam is out of the travel path of the subject caster wheel.

11. The alignment system of claim 10, further comprising a float guide disposed between said support frame and said float frame, said float guide defining the vertical path along which said float frame is movable relative to said support frame.

12. The alignment system of claim 9, wherein said support frame comprises a main frame configured to couple to the conveyor frame, a float frame defining a portion of said bypass system that is freely moveable relative to said main frame, and a float frame guide disposed between said main frame and said float frame, said float frame guide defining a vertical path along which said float frame is movable relative to said main frame.

13. The alignment system of claim 12, further comprising a vertical cam to urge said float frame to move about the vertical path in response to the transport vehicle moving through said alignment system, wherein said horizontal cam is disposed proximate a forward portion of said float frame and said horizontal cam comprises a guide profile having a narrow portion at the forward portion of said float frame and then tapering toward said support frame to a wide portion proximate a center portion of said float frame, wherein a caster wheel in an improper leading orientation will make contact with said horizontal cam near said narrow portion and will be urged by the guide profile as it progresses through said alignment system toward the wide portion of said horizontal cam such that the caster wheel is corrected from the improper leading orientation to the proper trailing orientation.

14. The alignment system of claim 13, wherein said vertical cam comprises a plate oriented in a vertical plane and having an obliquely sloped first contour and a horizontal second contour, said first and second contours configured to contact an axle of the transport vehicle as the transport vehicle passes said alignment system, said first contour having a first height beginning at a forward portion of said float frame and said first contour extending to a second height proximate a center portion of said horizontal cam, said second contour substantially horizontal and having a height equal to said second height of said first contour.

15. A conveyor system having a caster wheel alignment system for aligning improperly oriented caster wheels on transport vehicles that are operable along a travel path of the conveyor system, said conveyor system comprising:
a conveyor frame comprising a pair of parallel spaced apart guide rails;
a transport vehicle having a pair of spaced apart caster wheels, each of said pair of caster wheels configured to travel along a respective one of the guide rails of said conveyor frame such that said transport vehicle is movable along said conveyor frame; and
a wheel alignment system removably coupled to each of the guide rails of said conveyor frame, said wheel alignment system configured to automatically adjust the orientation of an improperly oriented caster wheel of said transport vehicle from an improper leading orientation in which the caster wheel is leading an axle of the transport vehicle to a proper trailing orientation in which the caster wheel is trailing the axle as the caster wheel passes said wheel alignment system.

16. The conveyor system of claim 15, wherein said wheel alignment system comprises:
a stationary frame configured to removably coupled to said conveyor frame proximate the travel path;
a bypass system configured to move substantially freely about a vertical path relative to said stationary frame;
a horizontal cam coupled to said stationary frame and positioned to impede a travel path of a miss-oriented caster wheel of said transport vehicle, said horizontal cam is configured to automatically adjust the orientation of the caster wheel from an improper leading orientation in which the caster wheel is leading an axle of said transport vehicle to a proper trailing orientation in which the caster wheel is trailing the axle.

17. The conveyor system of claim 16, wherein said bypass system comprises:
a float frame moveably coupled to said stationary frame, wherein said horizontal cam is coupled to said float frame such that said horizontal cam is moveably coupled to said stationary frame;
a float guide disposed between said stationary frame and said float frame and defining a vertical path along which said float frame is movable relative to said stationary frame; and
a vertical cam coupled to one of said float frame and said horizontal cam, said vertical cam configured to intercept and be impacted by a portion of the transport vehicle as it travels along the travel path through said wheel alignment system, wherein in response to an impact between said vertical cam and said transport vehicle said float frame is urged to raise such that said horizontal cam does not impact the caster wheel of a transport vehicle if that caster wheel is properly oriented in a trailing orientation.

18. The conveyor system of claim 17, wherein said vertical cam comprises a plate oriented in a vertical plane and having an obliquely sloped first contour and a horizontal second contour, said first and second contours configured to contact an axle of the transport vehicle as the transport vehicle passes said alignment system, said first contour having a first height beginning at a forward portion of said float frame and said first contour extending to a second height proximate a center portion of said horizontal cam, said second contour substantially horizontal and having a height equal to said second height of said first contour.

19. The conveyor system of claim 17, wherein said horizontal cam and said vertical cam are formed of a material having a hardness that is less than the hardness of the caster wheel of the transport vehicle.

20. The conveyor system of claim 16, wherein said horizontal cam is disposed proximate a forward portion of said stationary frame and said horizontal cam comprises a guide profile having a narrow portion at the forward portion of said stationary frame and then tapering toward said stationary frame to a wide portion extending outward from said narrow portion, wherein a caster wheel in an improper leading orientation will make contact with said horizontal cam near said narrow portion and will be urged by the guide profile as it progresses through said alignment system toward the wide portion of said horizontal cam such that the caster wheel is corrected from the improper leading orientation to the proper trailing orientation.

* * * * *